Figure 1:
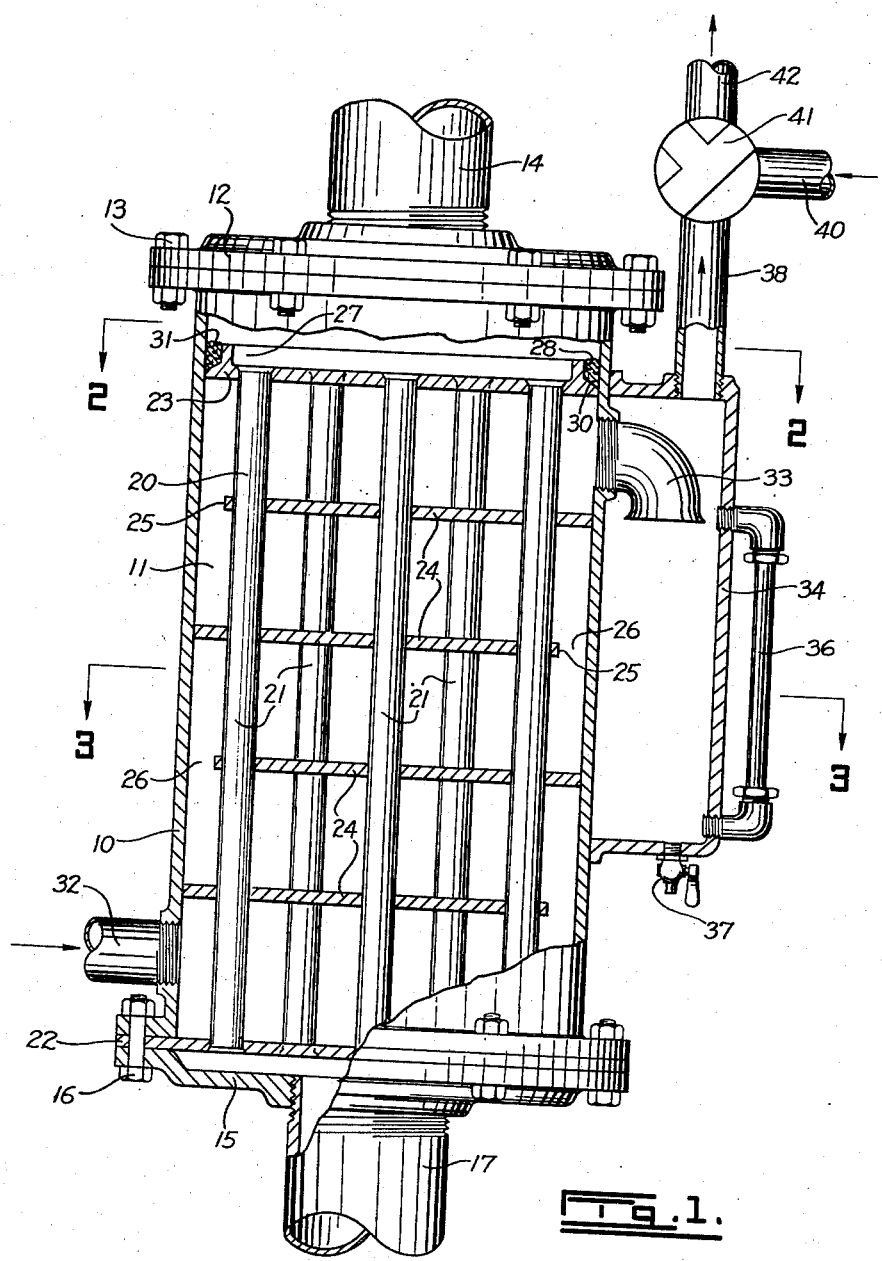

INVENTOR
Alfred Ernest Lauder
BY
Eugene E. Stevens
ATTORNEY

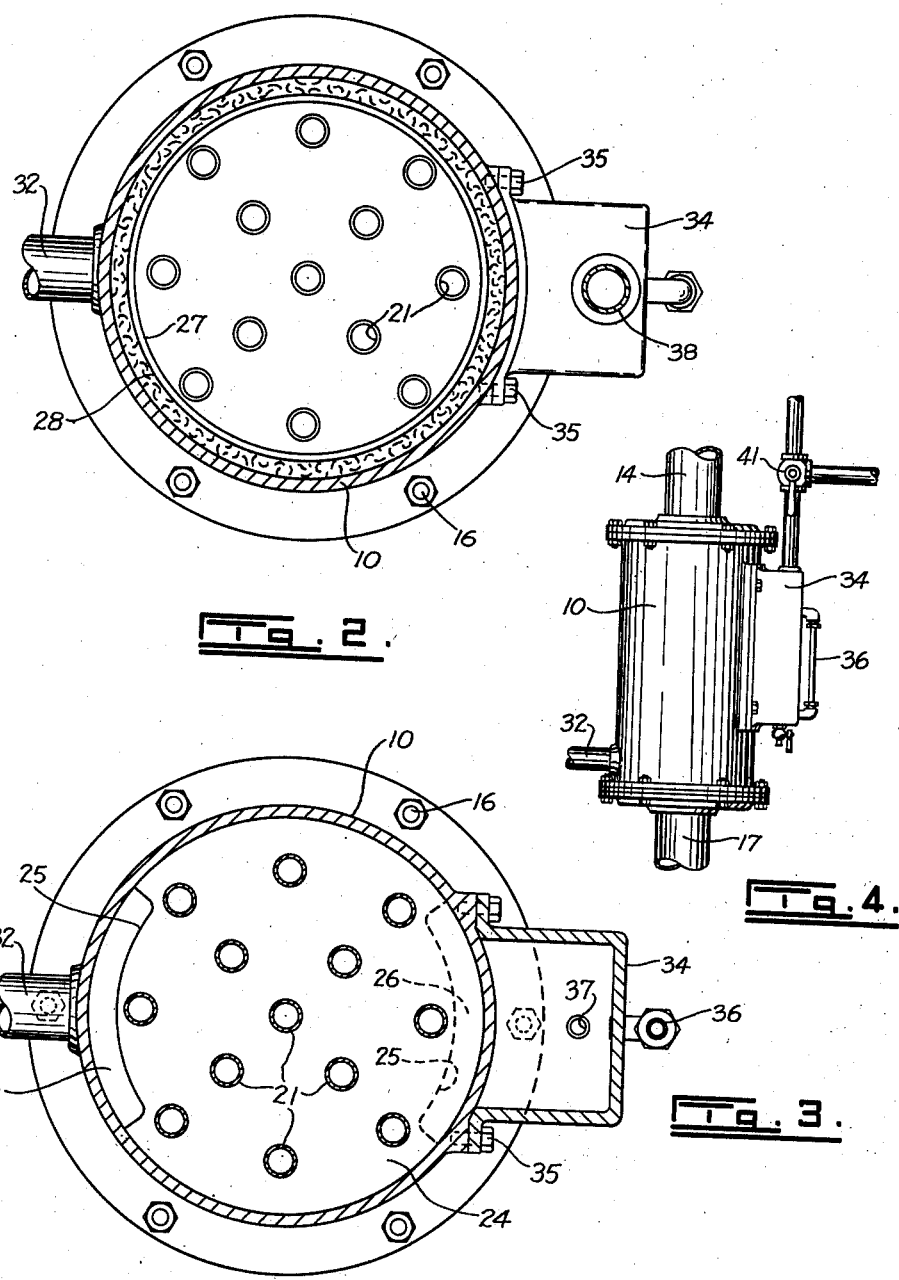

Patented Nov. 12, 1940

2,221,352

UNITED STATES PATENT OFFICE 2,221,352

FUEL VAPORIZER

Alfred Ernest Lauder, Vancouver, British Columbia, Canada

Application March 24, 1938, Serial No. 197,953

3 Claims. (Cl. 183—32)

This invention relates to an improved fuel vaporizer for internal combustion engines particularly adapted to vaporize fuel oil but which may be used with other fuels as well.

An object of the present invention is the provision of a fuel vaporizer adapted completely to vaporize the fuel before it enters the engine.

Another object is the provision of a fuel vaporizer adapted to prevent solid fuel from reaching the engine.

A further object is the provision of a fuel vaporizer that may be readily taken apart and assembled with a minimum of delay.

A further object is the provision of a fuel vaporizer including means for indicating whether or not the vaporizer is functioning properly.

Many attempts have been made to vaporize fuel oil for internal combustion engines by utilizing the heat of the exhaust therefrom but these have not proven practical. One of the main reasons a great many of the known devices are unsatisfactory is that they attempt to boil solid fuel in a container in order to vaporize it. This results in the accumulation of sediment, tar, etc., which gums up the pipes and impairs the operation of the device or renders it useless. Another disadvantage of the known devices is that the fuel is vaporized and then air is supplied to the vapor before it enters the engine. Attempts have been made to preheat this air but even then the air has been cooler than the vapor so that a certain amount of condensation takes place resulting in a certain amount of liquid fuel being drawn into the engine.

According to the present invention, the fuel is mixed with air and atomized before it is drawn into the vaporizer which is constructed to give a relatively great heating surface in a small area. In this way, the fuel is vaporized and the air is heated at the same time. Means is provided on the vaporizer for trapping any liquid fuel that might pass therethrough where practically all the trapped fuel will be vaporized. The heat exchanging means is formed in a complete unit that may be readily removed for cleaning and inspection and which is constructed to allow for expansion and contraction of the metals due to temperature changes.

The present invention consists essentially of a plurality of tubes and staggered baffle plates forming a heat exchange unit removably mounted in a main vaporizing chamber into which atomized fuel and air is drawn, said fuel being vaporized in the chamber by the heat from the exhaust of the engine. The vaporized fuel then passes into a secondary vaporizing chamber or receptacle mounted on the main vaporizing chamber in which any liquid fuel is trapped, when said fuel is drawn into the engine, as more fully described in the following specification and illustrated in the accompanying drawings, in which, Figure 1 is substantially a vertical sectional view of the fuel vaporizer, Figure 2 is a sectional view taken on the line 2—2 of Figure 1, Figure 3 is a sectional view taken on the line 3—3 of Figure 1, and Figure 4 is a reduced elevational view of the fuel vaporizer.

Referring more particularly to the drawings, 10 is a casing forming a main vaporizing chamber 11, said casing having a removable cover 12 held in place by bolts 13 and into which a pipe 14 is threaded leading from the exhaust manifold (not shown) of the engine with which the fuel vaporizer is used. The casing 10 is also provided with a removable bottom 15 held in place by bolts 16 and into which an exhaust pipe 17 is threaded.

A heat exchange unit 20 is removably mounted in the main vaporizing chamber 11. The heat exchange unit comprises a plurality of tubes 21 secured at their lower ends in a plate 22 and at their upper ends in a header 23 adapted to fit snugly inside the casing 10. A plurality of spaced-apart baffle plates 24 are mounted on the tubes 21 which baffle plates also are adapted to fit snugly within the casing 10. Each plate 24 is formed with a recess 25 in the edge thereof which, when the plate is mounted in the vaporizing chamber 11, forms therein an opening or passage 26. The openings or passages 26 are staggered in relation to each other so that the opening or passage of one baffle plate is situated on the opposite side of the vaporizing chamber to the openings or passages of the immediately adjoining baffle plates. Actually, the baffle plates 24 form a plurality of staggered baffles mounted on the tubes 21 in the vaporizing chamber, as clearly illustrated in Fig. 1 of the drawings. A circular rib 27 is formed on the upper surface of the header 23. The rib 27 is spaced from the periphery of the header to form a groove 28 the bottom 30 of which slopes downwardly and outwardly to said periphery. A ring of any suitable packing 31 is inserted in the groove 28 between the rib 27 and the casing 10. When the heat exchange unit 20 is in position (see Fig. 1), it is held in place by the plate 22 which is secured by the bolts 16 between the bottom 15 and the lower end of the casing 10. The sloping bottom 30 of the groove 28 causes the packing 31 to be jammed between the rib 27 and the casing 10 as the heat exchange unit is inserted into said casing.

An inlet pipe 32 extending from a carburetor of any suitable type (not shown) communicates with the main vaporizing chamber 11 at one side of said chamber adjacent the bottom thereof and an outlet pipe 33 communicates with the main vaporizing chamber immediately below the header 23 at the opposite side of the chamber, said outlet pipe preferably being turned downwardly, as shown. This outlet pipe is situated in a receptacle 34 forming a secondary vaporizing chamber mounted on the side of the casing 10 which is held in place by bolts 35, the casing 10 thus forming the inner wall of the receptacle. A gauge glass 36 is mounted on the outer wall of the receptacle 34 and a drain cock 37 is mounted in the bottom of said receptacle. A pipe 38 extends outwardly from the receptacle 34 preferably from the top thereof. The pipe 38 and another pipe 40, leading from an ordinary carburetor (not shown), each communicates with a two-way valve 41 from which a pipe 42 extends to the intake manifold of the engine. The valve 41 may be turned to shut off the pipe 38 and to connect the pipe 40 with the pipe 42 and the engine or it may be turned to shut off the pipe 40 and to connect the pipe 38 with said engine.

In use, the valve 41 is turned to bring the pipe 38 into communication with the engine. Exhaust from the engine enters the fuel vaporizer through the pipe 14, passes downwardly through the tubes 21 and out of the device through the pipe 17. Fuel, for example, fuel oil, is drawn into the main vaporizing chamber 11 through the pipe 32. This fuel oil is already mixed with air and atomized by the carburetor from which the pipe 32 extends. The atomized fuel follows a tortuous passage around the staggered baffle plates 24 during which time it is brought into intimate contact with the tubes 21 and vaporized by the heat from the exhaust passing therethrough. The vaporized fuel then passes through the pipe 33 which directs it downwardly so that any liquid fuel that may happen to pass through the main vaporizing chamber is deposited in the secondary vaporizing chamber or receptacle 34. The vaporized fuel is drawn from the receptacle 34 through the pipes 38 and 42 into the engine. Any liquid fuel that may accumulate in the receptacle 34 is vaporized by the heat in the casing 10 upon which the receptacle is mounted or by the heat of the vaporized fuel as it passes through the receptacle. If an excessive amount of liquid fuel accumulates in the receptacle, the level of which is indicated by the gauge glass 36, it may be drained off through the cock 37. The gauge glass will indicate whether or not the vaporizer is functioning properly since an excessive amount of liquid fuel in the receptacle will be the result of improper heat exchange in the main vaporizing chamber.

The movable header 23 allows for the expansion and contraction of the tubes 21 due to temperature changes, and the packing 31 prevents the exhaust from entering the vaporizing chamber 11 and the vaporized fuel from escaping therefrom other than through the pipe 33.

This fuel vaporizer may be very easily dismantled. In order to remove the heat exchange unit 20 for inspection or cleaning, it is only necessary to remove the bottom 15 and then to grasp the plate 22 and draw out the complete unit. In this way, the heat exchange unit may be cleaned with very little delay. The engine with which this fuel vaporizer is used, may be started on gasoline. When the valve 41 is turned to shut off the pipe 38 and to connect the pipe 40 with the pipe 42 and, consequently, the engine, gasoline is drawn from a suitable carburetor into the engine. After the engine has been running on gasoline for a short time, the valve 41 is turned so as to admit vaporized fuel oil into the engine.

From the above, it will readily be seen that a fuel vaporizer has been provided which is adapted completely to vaporize fuel and to prevent liquid fuel from reaching the engine and which may readily be dismantled for cleaning.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim as my invention is:

1. A fuel vaporizer for internal combustion engines comprising a main vaporizing chamber adapted to receive atomized fuel, a heat exchange unit including a plurality of tubes removably mounted in the chamber through which exhaust gases from the engine pass, a secondary vaporizing chamber associated with the main chamber, means for admitting vaporized fuel from the main chamber into the secondary chamber, means for directing the vaporized fuel downwardly in the secondary chamber, and means for withdrawing the vaporized fuel from adjacent the top of the secondary chamber.

2. A fuel vaporizer for internal combustion engines comprising a main vaporizing chamber adapted to receive atomized fuel, a heat exchange unit removably mounted in the chamber through which exhaust gases from the engine pass, a secondary vaporizing chamber mounted on the main chamber, a pipe communicating with the main and secondary chambers adjacent the top of the latter, said pipe being curved downwardly to direct vaporized fuel from the main chamber downwardly in the secondary chamber, and means for withdrawing the vaporized fuel from adjacent the top of the secondary chamber.

3. A fuel vaporizer for internal combustion engines comprising a casing forming a main vaporizing chamber, a cover and a bottom removably mounted on the casing, a heat exchange unit having a plurality of tubes secured at one end in a plate and at the other end in a header slidably mounted in the casing, said plate being adapted to be held in position by the securing means of the bottom of the casing, a plurality of baffles mounted on the tubes within the casing, a circular rib formed on the outer surface of the header, said rib being spaced from the periphery of the header to form a groove adapted to receive packing, a secondary vaporizing chamber mounted on the main chamber, means for admitting vaporized fuel from the main chamber into the secondary chamber, means for directing the vaporized fuel downwardly in the secondary chamber, and means for withdrawing the vaporized fuel from adjacent the top of the secondary chamber.

ALFRED ERNEST LAUDER.